UNITED STATES PATENT OFFICE.

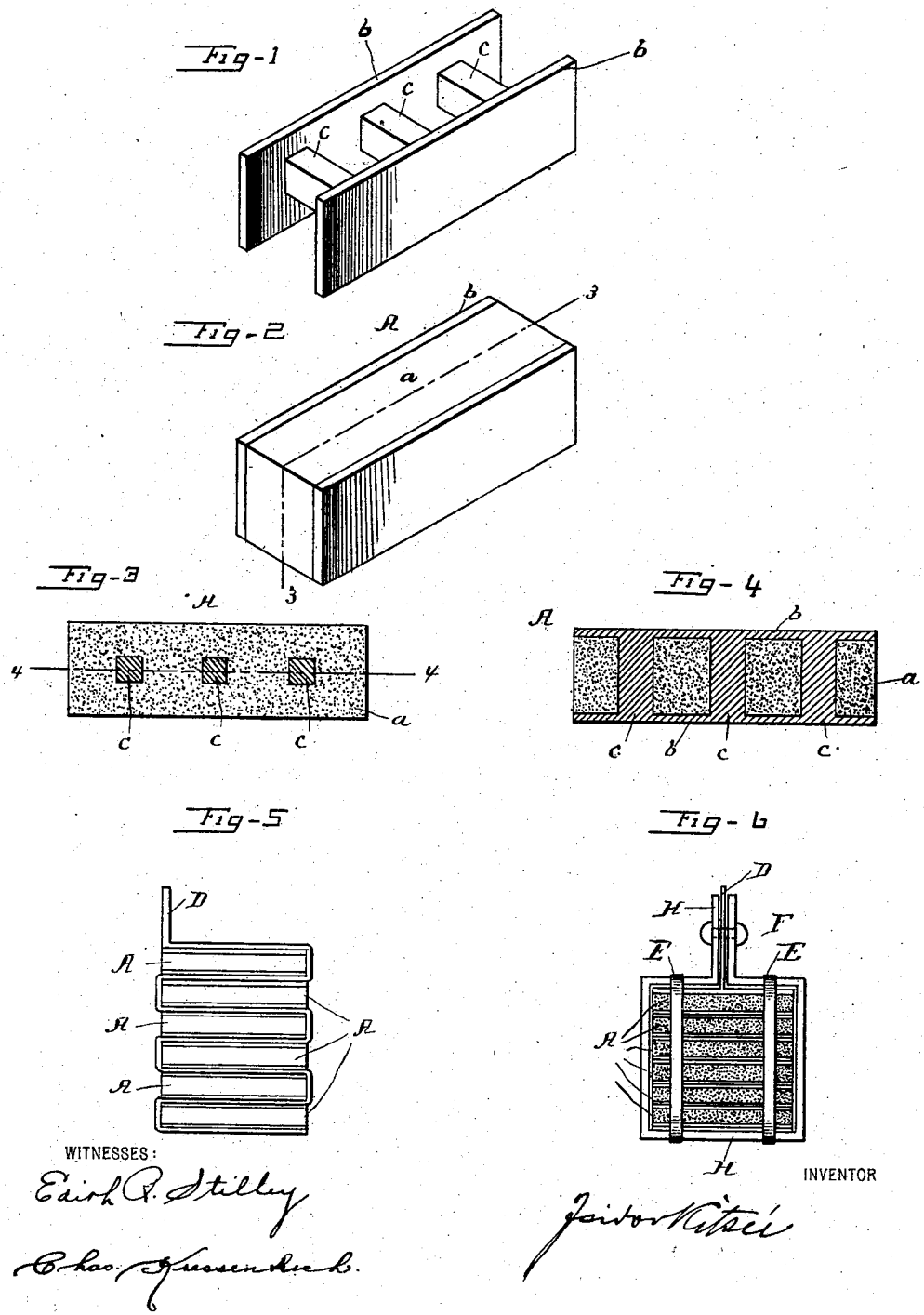

ISIDOR KITSEE, OF PHILADELPHIA, PENNSYLVANIA.

SECONDARY BATTERY.

SPECIFICATION forming part of Letters Patent No. 718,637, dated January 20, 1903.

Application filed April 28, 1900. Serial No. 14,689. (No model.)

*To all whom it may concern:*

Be it known that I, ISIDOR KITSEE, of the city and county of Philadelphia, State of Pennsylvania, have invented certain new and useful Improvements in Secondary Batteries, of which the following is a specification.

My invention relates to an improvement in secondary batteries.

The object of my invention is to produce a battery of the Faure type, which has none of the disadvantages of this type as used to-day.

It is well-known that a battery-plate of the Faure type consists of a supporting-grid provided with perforations and the active material, such as an oxid of lead, placed or plastered in said perforations. Such plate has the disadvantage that it easily buckles and that if disintegration sets in it is difficult to repair the same without entirely dismantling the whole pile. In later years the manufacture of such plates was discontinued, and recourse was taken again to secondary batteries of the Planté type. The durability of this type is greater than the durability of the type before mentioned; but the weight of such cells is out of proportion to their storing capacity, and in such cases where weight is a great object—as, for instance, in the employment of automobiles—these cells can be used only with great disadvantage. To give figures, a cell weighing thirty-five pounds manufactured by one of the largest of the storage-battery manufacturers is capable only, according to their own statement, to give out in electrical energy eighty ampere hours, and, in fact, this output is reduced in practice to about sixty ampere hours.

To produce a cell of great capacity and yet having none of the disadvantages of the Planté cells as produced to-day is the object of my invention.

Referring to the drawings, Figure 1 is a perspective view of what I call a "skeleton frame" of an individual block. Fig. 2 is a perspective view of the finished block. Fig. 3 is a section on line 3 3 of Fig. 2. Fig. 4 is a section on the line 4 4 of Fig. 3. Fig. 5 is a side elevation of a series of blocks assembled into one electrode. Fig. 6 is a side elevation of an electrode embodying my invention.

A is the block as an entirety, of which $b\,b$ are the face-plates of the skeleton. $c\,c$ are the connecting-lugs, and $a$ the active material. The mode or method of producing such block is as follows: The skeleton is first cast or molded into shape, and consists, preferably, of lead or lead alloy. Into the spaces of the skeleton is pressed by suitable machinery the active material, which preferably consists of an oxid of lead, or instead of providing the skeleton with the lead salt the skeleton can be placed into an electrolytic solution containing a nitrate of lead, or, if desired, an acetate of lead, and with the aid of the current metallic lead can be deposited on its surface. In my experiments I have found that it is hardly possible to deposit the metallic lead in the spaces without having this lead all over the outer and inner surfaces. It is therefore necessary if this mode of providing the skeleton with the active material is adopted to compress from time to time the deposited lead and to scrape the same from the outer surface. Each of the blocks is a unit in itself, and if an electrode is to be produced two or more of these blocks should be assembled either with a conducting material between the same, as shown in Fig. 5, or by simply placing one block upon the other without the intervention of any foreign conductor, as illustrated in Fig. 6. In Fig. 5, D is the conductor, bent so as to form spaces, into which these blocks are placed. In Fig. 6 the blocks are, as said above, without the intervention of any foreign conductor placed one on top of the other, and the face-plate of the uppermost block is provided with the lug D, and the whole structure is provided with the surrounding frame H. The whole series of these blocks is contained in a frame which may be conducting or otherwise. The terminals of this frame are bolted together by the rivet F, and the whole electrode is provided with the bands E. In practice it is best to provide the block lowest in the series with the conducting-lug, as otherwise in raising the electrode the contact between one and the other of the face-plates may be disturbed.

In practice I prefer to make each of the individual blocks of about the following dimensions: four inches long, three-quarters of an inch thick, and one inch high. It is obvious that these dimensions may be altered to suit the requirements. A person versed in the art will readily understand that the electrode formed of such blocks cannot buckle, will offer very low resistance, and as the blocks are interchangeable and readily removed and replaced the repair of any part of such an electrode is easily accomplished. As to capacity an electrode of this kind will have an electrical output, weight for weight, double the electrical output of the electrode as now used in automobiles by one of the largest storage-battery companies and which electrode is of the Planté type.

Having now described my invention, what I claim as new, and desire to secure by Letters Patent, is—

1. In an electric cell an electrode consisting of the conductor proper, said conductor formed so as to provide spaces for the active material in combination with an active material consisting of a series of individual and independent blocks, each block consisting of a conducting-skeleton and active material contained in the spaces of said skeleton.

2. An electrode for electric cells consisting of the conductor proper, a series of individual and independent blocks, said blocks placed in the recesses with which said conductor is provided, each of said independent blocks consisting of a conducting-support and active material around said support.

3. In a secondary battery an electrode consisting of a conducting-strip bent in a manner so as to form spaces, a series of independent blocks placed in said spaces, each of said blocks consisting of a conducting-skeleton and active material in contact with said conducting-skeleton.

In testimony whereof I hereby sign my name, in the presence of two subscribing witnesses, this 27th day of April, A. D. 1900.

ISIDOR KITSEE.

Witnesses:
 EDITH P. STILLEY,
 WALLACE B. ELDRIDGE.